(12) United States Patent
Liang et al.

(10) Patent No.: US 7,424,055 B2
(45) Date of Patent: Sep. 9, 2008

(54) METHOD OF VIDEO MOTION DETECTION BY ADJUSTING THE FIELDS' LENGTH IN THE TEMPORAL DOMAIN AND SELECTING THE CONFIGURABLE PATTERNS IN THE SPATIAL DOMAIN

(75) Inventors: Kuan Liang, Hsin-Chu (TW); David Hsu, Hsin-Chu (TW); Chao-Chee Ku, Hsin-Chu (TW)

(73) Assignee: Weltrend Semiconductor, Inc., Hsin-Chu (TW)

( * ) Notice: Subject to any disclaimer, the term of this patent is extended or adjusted under 35 U.S.C. 154(b) by 881 days.

(21) Appl. No.: 10/877,081

(22) Filed: Jun. 24, 2004

(65) Prior Publication Data

US 2005/0057688 A1    Mar. 17, 2005

(30) Foreign Application Priority Data

Sep. 12, 2003   (TW) .............................. 92125135 A

(51) Int. Cl.
*H04B 1/66* (2006.01)
*H04N 7/12* (2006.01)
*H04N 11/02* (2006.01)
*H04N 11/04* (2006.01)

(52) U.S. Cl. ............................ 375/240.01; 375/240.16; 382/236

(58) Field of Classification Search ............ 375/240.16; 382/236
See application file for complete search history.

(56) References Cited

U.S. PATENT DOCUMENTS

| | | | | |
|---|---|---|---|---|
| 6,061,100 A | * | 5/2000 | Ward et al. ................... | 348/607 |
| 6,317,460 B1 | * | 11/2001 | Lee ........................ | 375/240.16 |
| 6,519,005 B2 | * | 2/2003 | Bakhmutsky et al. .... | 348/415.1 |
| 7,113,544 B2 | * | 9/2006 | Tanase et al. .......... | 375/240.16 |
| 2004/0119884 A1 | * | 6/2004 | Jiang .......................... | 348/448 |

* cited by examiner

*Primary Examiner*—Marsha D. Banks-Harold
*Assistant Examiner*—Jessica Roberts
(74) *Attorney, Agent, or Firm*—Anthony R. Barkume

(57) ABSTRACT

A method for separating the motion and stationary video pixels during the video de-interlacing process by adjusting the fields' length in the temporal domain and selecting the configurable patterns in the spatial domain.

9 Claims, 4 Drawing Sheets

| | F1 | F2 | F3 | F4 | F5 | F6 | F7 |
|---|---|---|---|---|---|---|---|
| Odd Fields' Differences | D1 | | D3 | | D5 | X | D7 |
| Even Fields' Differences | | D2 | | D4 | | D6 | |

|   | E |   |
|---|---|---|
|   |   |   |
| G | A | K |
|   |   |   |
|   | I |   |

|   |   |   |
|---|---|---|
| M | C | N |
|   | X |   |
| P | D | Q |
|   |   |   |

|   | F |   |
|---|---|---|
|   |   |   |
| H | B | L |
|   |   |   |
|   | J |   |

| Odd Fields | F1 | | F3 | | F5 | X | F7 |
|---|---|---|---|---|---|---|---|
| Even Fields | | F2 | | F4 | | F6 | |

Figure 2

| | | | | |
|---|---|---|---|---|
| | | | | |
| P1 | P2 | P3 | P4 | P5 |
| X1 | X2 | X | X3 | X4 |
| P6 | P7 | P8 | P9 | P10 |
| | | | | |

Even Line ------
Odd Line ------
Even Line ------

Figure 3

|  | F1 | F2 | F3 | F4 | F5 | F6 | F7 |
|---|---|---|---|---|---|---|---|
| Odd Fields' Differences | D1 |  | D3 |  | D5 | X | D7 |
| Even Fields' Differences |  | D2 |  | D4 |  | D6 |  |

Figure 4

METHOD OF VIDEO MOTION DETECTION BY ADJUSTING THE FIELDS' LENGTH IN THE TEMPORAL DOMAIN AND SELECTING THE CONFIGURABLE PATTERNS IN THE SPATIAL DOMAIN

FIELD OF THE INVENTION

The present invention is related to a motion and stationary video pixels separating method, and more particularly to the motion and stationary video pixels separating method during the video de-interlacing process by adjusting the fields' length in the temporal domain and selecting the configurable patterns in the spatial domain. The present invention not only will refer to the fields' information with different length in the temporal domain, but will also refer to the different configuration patterns in the spatial domain. The configurable spatial domain patterns can be one pixel, one line or an area, depending on the required combinations. By doing so, the detection and separation of the stationary and the motion video pixels during the video de-interlacing process becomes very efficient and reliable.

BACKGROUND OF THE INVENTION

In general, the video signals of TV and DVD video are interlaced, and are not progressive as in the computer monitor display. There are two fields in the interlaced scanning. The odd scan lines form one field and the even scan lines form another field. And, the TV controller uses these two fields to show the TV video signals onto the TV screen. If the TV screen is a CRT display, due to the material characteristics of it, the display between pixels and pixels will be overlapped when electron beam hits onto the surface (phosphorus), so the sawtooth on the screen will be fogged and still looked smooth; also, due to the persistence of vision and the response time with human's vision, the flicker generated by the display screen will not be very conspicuous for enough distance (human's vision is very easy to sense the flicker of big area but not a small area).

Because of the developing technologies progress of digital system and flat panel, lots of products with flat panels are well implemented, such as flat TV, LCD monitors, etc. Because of the material issues of panel, the characteristics of display with flat panel are quite different from the traditional CRT monitor (such as the response time, the there is no overlapped characteristic between pixels and pixels under displaying). Whenever a video is displayed onto the flat panel, the artifacts will be much more conspicuous than displayed onto the CRT monitor, such as sawtooth, serration, and judder, etc. Furthermore, the above disadvantages will be more and more conspicuous when the panel size getting bigger and bigger. Therefore, in order to obtain a better display quality, most likely the TV video signal will not be displayed onto the flat panel until a de-interlacing is processed. So, designing a good de-interlacer for the LCD TV becomes a very important task.

The frame buffer structure for a typical de-interlacing process is shown as FIG. 1, which can be used to detect and calculate the target point X by three fields F2, F1, and F0. F1, F2, and F0 are interlaced fields mutually, the neighbored pixels C, D, M, N, P, and Q of target pixel X are located in the F1 field (target field); the neighbored pixels B, F, H, J, and L of target pixel X are located in the F2 field, which is in front of the F1 field; and the neighbored pixels A, E, G, I, and K of target pixel X are located in the F0 field, which is behind the F1 field. But, if the video signal contains stationary and motion video pixels concurrently (such as stationary caption and motion background), and if the stationary video is displayed for a period of time, then the typical de-interlacing technology which only refers to three or four fields will not be enough and efficient to separate the motion and stationary video pixels from the video signals. Increasing the reference fields will improve this problem for having more temporal information, but will also increase the requirement of memory bandwidth, and this is a problem for hardware implementation. In this invention, we propose a method which can keep up to seven fields temporal information while only needs three fields bandwidth by using the fields' differences storing back method. And, by incorporating with the spatial domain patterns, the correct rate of motion detection for several of video combinations can be further enhanced.

SUMMARY OF THE INVENTION

An objective of the present invention is to provide a motion and stationary video pixels separating method while doing the video de-interlacing.

Another objective of the present invention is to adjust the fields' length in the temporal domain and select the configurable patterns in the spatial domain to perform the motion detection, which can perform better motion detection due to the reference of both the temporal and the spatial information, here, when the referred fields' length in the temporal domain is short, the selected configurable pattern in the spatial domain will be an area; and when the referred fields' length in the temporal domain is long, the selected configurable pattern in the spatial domain will be enhanced to a line or a pixel.

Another objective of the present invention is to separate the stationary and motion pixels video very efficient and reliable, also to enhance the correction rate of motion and stationary video pixels detection during the de-interlacing process, by doing so, the video quality can be improved and the annoy artifacts can be eliminated.

BRIEF DESCRIPTION OF THE INVENTION

According to the present invention, a method for separating the motion and stationary video pixels during the video de-interlacing process by adjusting the fields' length in the temporal domain and selecting the configurable patterns in the spatial domain, and the method comprises steps of:

Providing an interlaced video sequence of continuous temporal domain, the interlaced video sequence contains multiple first Fields (such as odd fields) and multiple second Fields (such as even fields), and the multiple first Fields (such as odd fields) and multiple second Fields (such as even fields) are mutually interlaced videos. Further more, the multiple second Fields (such as even fields) also contains a target field to be processed and the target field contains a target pixel to be processed;

Detecting a first state; the first state represents a relative target pixel in the multiple first Fields (such as odd fields) is constant;

Detecting a second state; the second state represents, in the multiple second Fields (such as even fields), the first pixel of one Line of the spatial coordinate location related to the target pixel, and the second pixel of the next Line of the spatial coordinate location related to the target pixel are both constant; where the first pixel, the second pixel, and the pixel of the spatial coordinate location related to the target pixel are on the same Line;

Detecting a third State; the third State represents, in the target field, the pixels of the spatial coordinate location of the upper and lower neighbored pixels related to the target pixel are constant;

Detecting a fourth State; the fourth State represents, in the previous interlaced field and the next interlaced field of the target field, the pixels of the spatial coordinate location of the neighbored left and right pixels related to the target pixel are constant;

If the first State and the second State are both satisfied the set criteria, then the target pixel is classified as stationary; and If the third State and the fourth State are both satisfied the set criteria, then the target pixel is classified as motion.

In accordance with one aspect of the present invention, the multiple first Fields are odd fields and the multiple second Fields are even fields.

In accordance with one aspect of the present invention, the multiple first Fields are even fields and the multiple second Fields are odd fields.

In accordance with one aspect of the present invention, for detecting the first State, the second State, the third State, and the fourth State, $\{|F_n(P)-F_{n-2}(P)|<=\alpha\}$ is used to measure the variation of the P Pixel in the $F_n$ Field, where n is the Field Index, and $\alpha$ is a threshold value.

In accordance with one aspect of the present invention, for the first State, $F_n$ is one of the multiple first Fields.

In accordance with one aspect of the present invention, for the second State, $F_n$ is one of the multiple second Fields.

In accordance with one aspect of the present invention, for the third State, $F_n$ is the target field.

In accordance with one aspect of the present invention, for the fourth State, $F_n$ is the previous interlaced field and next interlaced field of the target field.

Finally, we can use a counter to record the measured result of $\{|F_n(P)-F_{n-2}(P)|<=\alpha\}$.

If $\{|F_n(P)-F_{n-2}(P)|<=\alpha\}$ is true, then the counter is increased; if $\{|F_n(P)-F_{n-2}(P)|<=\alpha\}$ is false, then the counter is cleared.

The present invention may best be understood through the following description with reference to the accompanying drawings, in which:

BRIEF DESCRIPTION OF THE DRAWINGS

Figure 1:
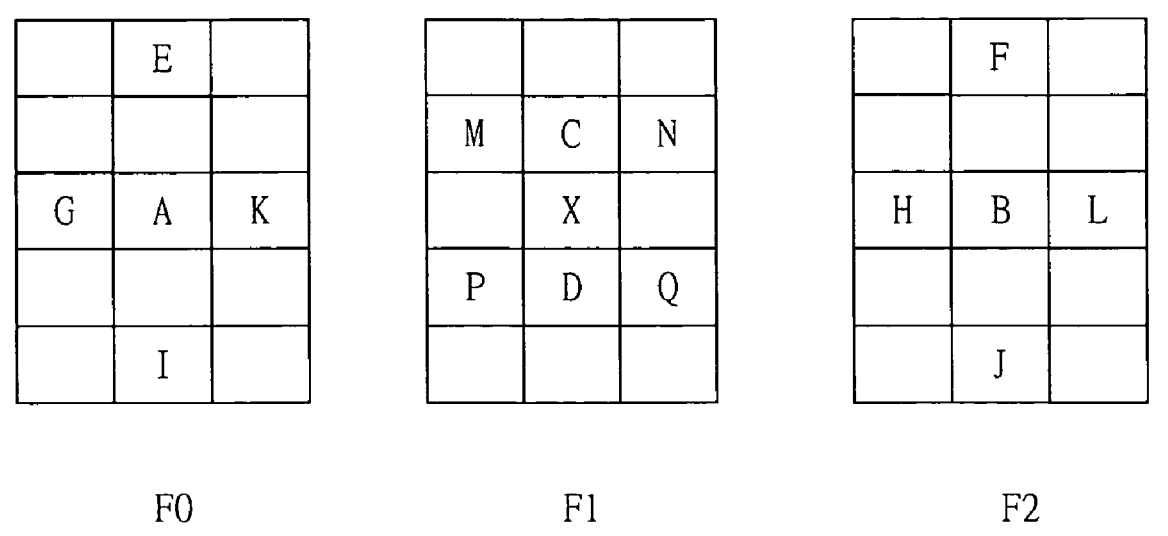

FIG. 1 shows the frame buffer structure of typical de-interlacing method to detect and obtain the target pixel X by using three fields, namely F2, F1, and F0;

FIG. 2 shows the temporal domain's reference fields according to the present invention;

FIG. 3 shows the spatial domain's reference pixels according to the present invention;

FIG. 4 shows the corresponding relationship between field $F_n$ and decision expression Dn.

DETAILED DESCRIPTION OF THE PREFERRED EMBODIMENT

FIG. 2 shows the temporal domain's reference fields according to the present invention. As shown in the figure, the preferred embodiment of the present invention refer up to 7 fields, in which F1, F3, F5 and F7 are odd fields, and F2, F5, F6 are even fields, and F6 is the target field that need to be processed, and X is the target pixel that need to be obtained in the F6.

FIG. 3 shows the spatial domain's reference pixels according to the present invention. As shown in the figure, X is the target pixel that corresponds to the target field F6 in the spatial domain, and X1 to X4 are the left and right neighbored pixels that correspond to X in the spatial coordination, also X and X1 to X4 are on the odd line in the field; further more, P1 to P5 are the neighbored pixels of the even line that correspond to the upper X in the spatial coordinate, and P6 to P10 are the neighbored pixels of the even line that correspond to the lower X in the spatial coordinate.

The preferred embodiment of the present invention that adjusts the fields' length in the temporal domain and selects the configurable the patterns in the spatial domain during the video de-interlacing process for separating motion and stationary video pixels, and the execution steps of the separating method are listed as below:

1. Reading continuous video sequence from different temporal domain, such as the fields from F1 to F7 in FIG. 2, and F6 is the target field that is going to be processed.

2. Defining decision expression Dn, setting $Dn=\{|F_n-F_{n-2}|<=\alpha\}$, $\alpha$ is a threshold value And the corresponding relationship between fields F1 to F7 and Dn is shown as FIG. 4.

3. Defining the first State SX, setting

SX=D1(X) & D3(X) & D5(X) & D7(X)

This first State SX is used to detect the difference between the pixels of spatial coordination that correspond to X in the odd fields F1, F3, F5, and F7.

4. Defining the second State S1 to S5, setting

S1=D2(P1) & D4(P1) & D6(P1) & D2(P10) & D4(P10) & D6(P10)

S2=D2(P2) & D4(P2) & D6(P2) & D2(P9) & D4(P9) & D6(P9)

S3=D2(P3) & D4(P3) & D6(P3) & D2(P8) & D4(P8) & D6(P8)

S4=D2(P4) & D4(P4) & D6(P4) & D2(P7) & D4(P7) & D6(P7)

S5=D2(P5) & D4(P5) & D6(P5) & D2(P6) & D4(P6) & D6(P6)

In above expressions, P1 and P10, P2 and P9, P3 and P8, P4 and P7, P5 and P6 will be on the same lines with X in the spatial coordination (the first pixel, X, the second pixel). Therefore, this second State S1 to S5 is used to detect the difference between lines of the spatial coordination of the upper and lower neighbored pixels P1 to P10 that correspond to X. In real situation, detecting the differences of direct lines just need to observe one of them. Therefore, in the decision expressions of this second State, the detection can be recognized only when one of these S1 to S5 is established.

5. For the first State and the second State, if $\{SX \& (S1|S2|S3|S4|S5)\}==1$, X can be classified as stationary; otherwise X can be classified as motion. If fields' length in the temporal domain is long enough (reference fields F1 to F7), we may separate the motion and stationary video pixels by the differences of pixels or lines.

6. Defining the third State SS1 to SS6 and the fourth State SS7 to SS9, setting

SS1=D6(P2)

SS2=D6(P3)

SS3=D6(P4)

SS4=D6(P7)

SS5=D6(P8)

SS6=D6(P9)

SS7=D5(X2) & D7(X2)

SS8=D5(X) & D7(X)

SS9=D5(X3) & D7(X3)

The third State SS1 to SS6, and the fourth State SS7 to SS9, both are used to detect the differences of areas that are generated by the spatial coordination of neighbored pixels (P2 to P9, X2, X3) correspond to X in Fields F5, F6 and F7.

7. For the third State and the fourth State, if {SS1 & SS2 & ... & SS8 & SS9}==1, then X can be classified as stationary, otherwise X can be classified as motion. If the fields' length in the temporal domain is short enough (refer to fields F5 to F7), then we may separate the motion and stationary video pixels by the differences of areas.

In the above steps of the present invention, if we have to refer all the continuous video sequences in the temporal domain by hardware processing, then we must have enough frame buffers to store the fields' information of the video sequences. This will increase the cost of manufacturing absolutely. Therefore, to perform the state detection of long temporal axis, a counter (Count) can be used to count the accumulated differences so that the bandwidth requirement can be reduced and the cost (required external memory) can be reduced accordingly. That is, If $Dn=1$, then Count=Count+1

If $Dn=0$, then Count=0.

Then, the states of the previous fields will be recorded. By this counter, we may modify the above first State SX, second State S1 to S5, third State SS1 to SS6, and fourth State SS7 to SS9 as following expressions:

SX=(count_odd>=3) & D7(X)
S=(count$_{P1>=}$3) & (count$_{P10>=}$3)
S2=(count$_{P2>=}$3) & (count$_{P9>=}$3)
S3=(count$_{P3>=}$3) & (count$_{P8>=}$3)
S4=(count$_{P4>=}$3) & (count$_{P7>=}$3)
S5=(count$_{P5>=}$3) & (count$_{P6>=}$3)
SS1=(count$_{P2>=}$1)
SS2=(count$_{P3>=}$1)
SS3=(count$_{P4>=}$1)
SS4=(count$_{P7>=}$1)
SS5=(count$_{P8>=}$1)
SS6=(count$_{P9>=}$1)
SS7=(count$_{X2>=}$1) & D7(X2)
SS8=(count$_{X>=}$1) & D7(X)
SS9=(count$_{X3>=}$1) & D7(X3)

Where, count_odd is used to record the states of D1(X), D3(X), and D5(X); count_Pn is used to record the states of D2(Pn), D4(Pn), and D6(Pn); count$_{x}$2, count_X, and count$_{x}$3 are used to record the states of D5(X2), D5(X), and D5(X3). Therefore, we may use X pixel as the center, the reference length of temporal axis as the size of Count, the reference area of spatial axis as the width, and by selecting the configurable patterns in the spatial domain (the width of the reference area), and adjusting the fields' length in the temporal domain (the size of the Count), to enhance the performance of motion and stationary video pixels separation. And this is the enhancement and creation spirit of the present invention.

The preferred embodiment of the present invention reads the continuous video sequences for 7 fields of temporal domain, and the target field that needs to be processed is located at the even field. Of course, the technology of the present invention can also be used for continuous video sequence of temporal domain with more or less fields, and the target field that needs to be processed locates in the odd field.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for separating the motion and stationary video pixels during the video de-interlacing process by adjusting the fields' length in the temporal domain and selecting the configurable patterns in the spatial domain, and the method comprising steps of:

providing an interlaced video sequence of continuous temporal domain; said interlaced video sequence containing multiple first fields and multiple second fields, and said multiple first fields and multiple second fields being mutually interlaced videos; said multiple second fields also containing a target field to be processed and said target field containing a target pixel to be processed;

detecting a first state; said first state representing a pixel of the spatial coordinate location related to said target pixel in said multiple first fields being constant;

detecting a second state; said second state representing, in said multiple second fields, a first pixel of one line of the spatial coordinate location related to said target pixel, and a second pixel of the next line of the spatial coordinate location related to said target pixel being both constant; where said first pixel, said second pixel, and said pixel of the spatial coordinate location related to said target pixel are on the same line;

detecting a third state; said third state representing, in said target field, the pixels of the spatial coordinate location of the upper and lower neighbored pixels related to said target pixel are constant;

detecting a fourth state; said fourth state representing, in the previous interlaced field and the next interlaced field of said target field, the pixels of the spatial coordinate location of the neighbored left and right pixels related to said target pixel being constant;

if said first state and said second state being both satisfied, then said target pixel being classified as stationary; and if said third state and said fourth state are both satisfied, then said target pixel being classified as motion;

wherein for detecting said first state, said second state, said third state, and said fourth state, $\{|F_n(P)-F_{n-2}(P)|<=\alpha\}$ is used to measure the variation of the P pixel in the $F_n$ field, where n is the field Index, and $\alpha$ is a threshold value.

2. The method according to claim 1 wherein said multiple first fields are odd fields and said multiple second fields are even fields.

3. The method according to claim 1 wherein said multiple first fields are even fields and said multiple second fields are odd fields.

4. The method according to claim 1 wherein $F_n$ is one of said multiple first Fields.

5. The method according to claim 1 wherein for the second state, $F_n$ is one of said multiple second Fields.

6. The method according to claim 1 wherein for the third state, $F_n$ is said target field.

7. The method according to claim 1 wherein for the fourth state, $F_n$ is the previous interlaced field and next interlaced field of said target field.

8. The method according to claim 1 wherein a counter is used to record the measured result of $\{|F_n(P)-F_{n-2}(P)|<=\alpha\}$.

9. The method according to claim 8 wherein, if $\{|F_n(P)-F_{n-2}(P)|<=\alpha\}$ is true, then the counter is increased; if $\{|F_n(P)-F_{n-2}(P)|<=\alpha\}$ is false, then the counter is cleared.

* * * * *